United States Patent [19]
Greutman

[11] 3,761,928
[45] Sept. 25, 1973

[54] SIMPLIFIED DIGITAL TO SIN/COS CONVERTER

[75] Inventor: Weldon W. Greutman, Hicksville, Ohio

[73] Assignee: International Telephone and Telegraph Corporation, Nutley, N.J.

[22] Filed: Dec. 13, 1971

[21] Appl. No.: 207,250

[52] U.S. Cl. .............. 343/16 R, 315/23, 343/5 SC, 343/5 DP
[51] Int. Cl. .............................................. G01s 9/06
[58] Field of Search .............. 343/16 R, 10 R, 11 R, 343/5 SC, 5 DP; 315/23, 24

[56] References Cited
UNITED STATES PATENTS
3,178,709 4/1965 White et al. ...................... 343/16 R
3,500,402 3/1970 Huele et al. ...................... 343/16 R
3,476,974 11/1969 Turnage et al. ...................... 315/23

*Primary Examiner*—Benjamin A. Borchelt
*Assistant Examiner*—G. E. Montone
*Attorney*—C. Cornell Remsen, Jr. et al.

[57] ABSTRACT

The invention provides a conversion arrangement, particularly applicable to radar, for converting digital information representative of the rotational (azimuthal) position of the radar antenna to sine and cosine of azimuth waveforms for use in a display such as a plan position indicator. A frequency oscillator standard is coupled to an $n$-stage reference counter the square wave output of which is subsequently filtered to provide a reference cosine wave of predetermined frequency. Azimuth change pulses representative of the antenna positional rotation are mixed with the frequency oscillator standard and coupled to a second $n$-stage or $n$-bit counter operating in like manner to the reference counter. The content of the second counter is advanced with respect to the reference counter by one count per azimuth change pulse, the second counter in turn serving to generate cosine and sine sampling pulses. These pulses sample the reference cosine wave to provide an output signal which when filtered derives cosine $\phi$ and sine $\phi$ positional information signals respectively. System reference is obtained by presetting the second $n$-stage counter to equal the reference counter in dependence upon each received azimuth reference pulse.

9 Claims, 3 Drawing Figures

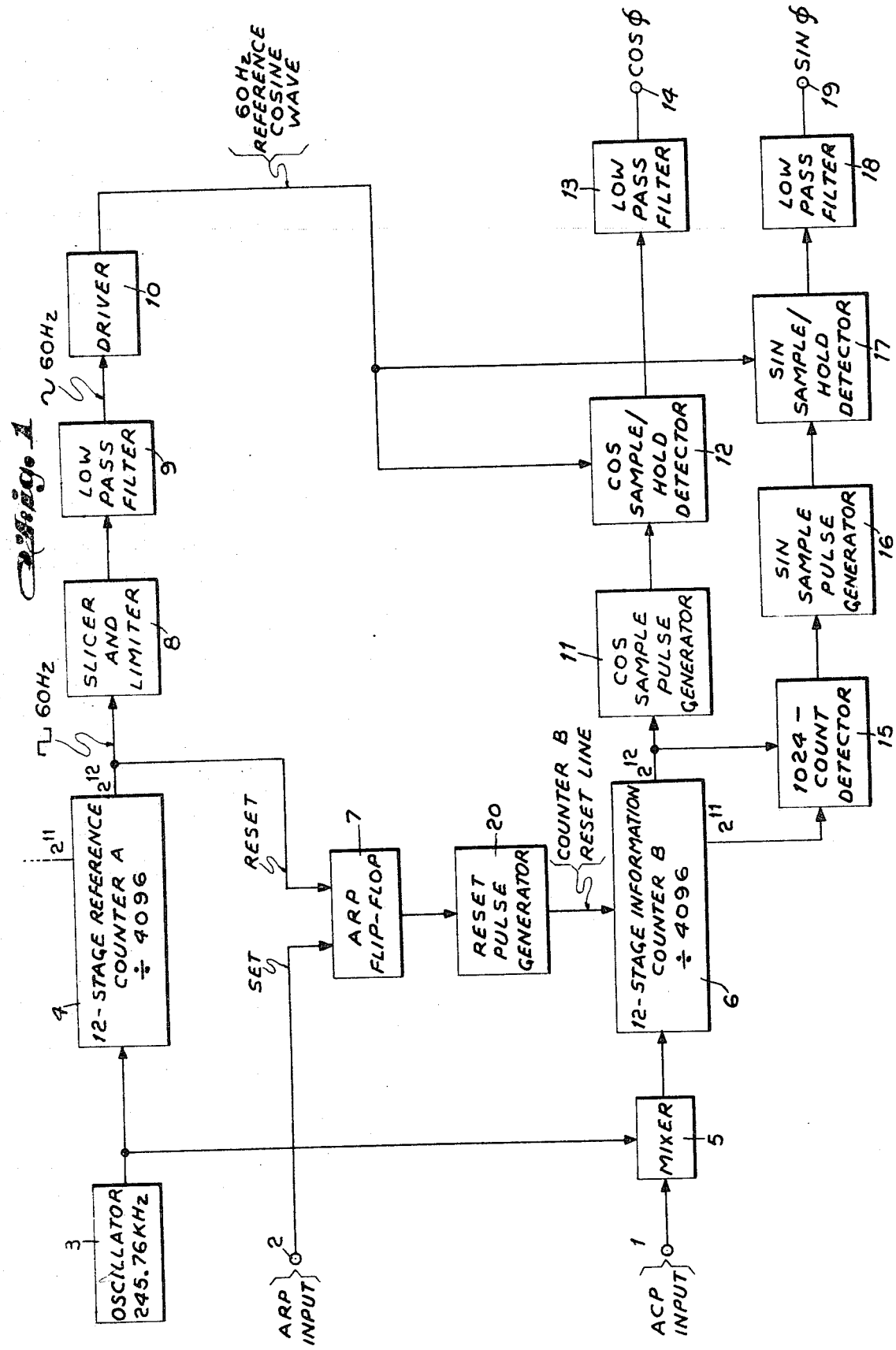

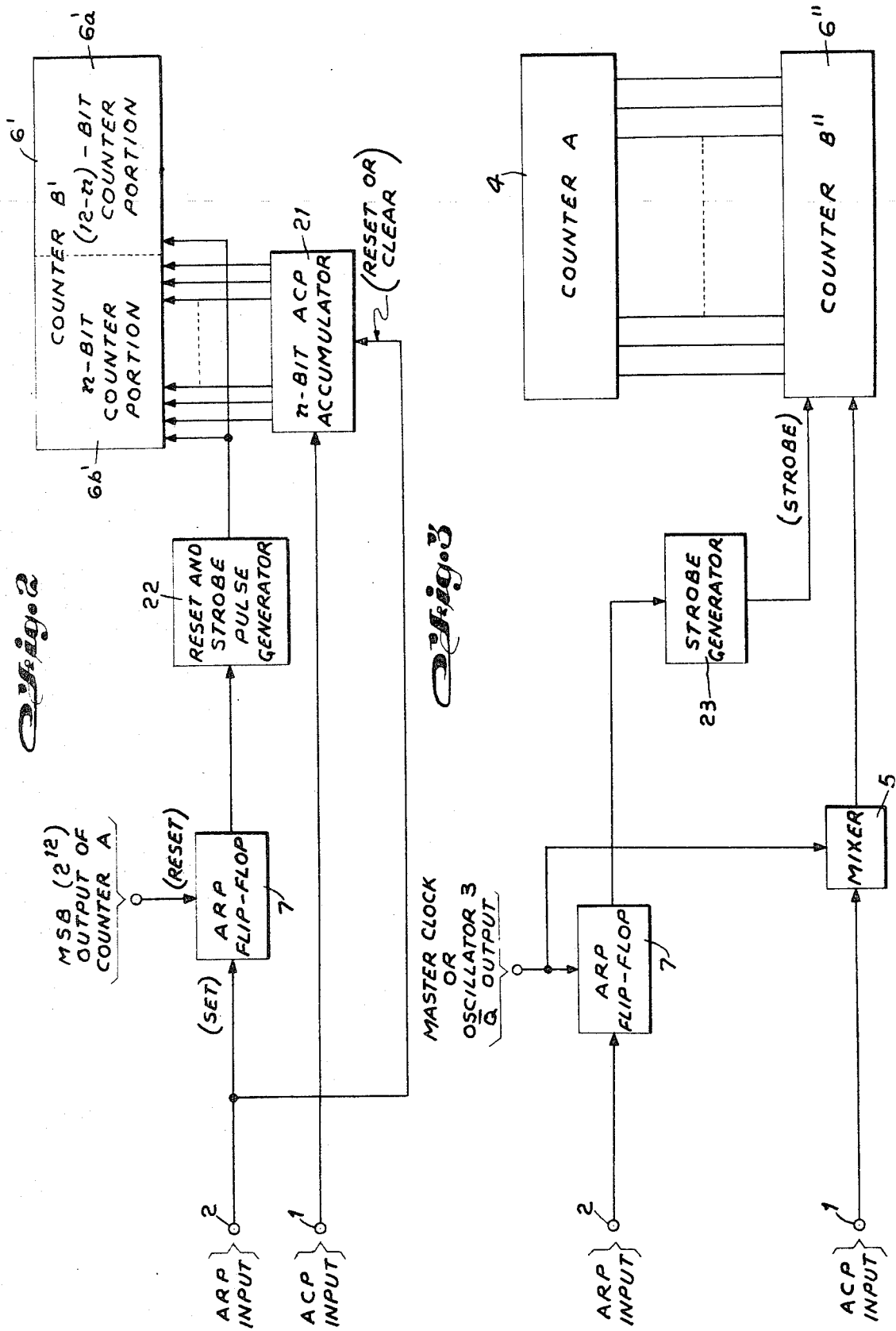

SIMPLIFIED DIGITAL TO SIN/COS CONVERTER

CROSS REFERENCES TO RELATED APPLICATIONS

This application is related to the following U.S. patent applications:

1. Ser. No. 168,246, to W.W.Greutman and I.R.-Studebaker, filed Aug. 2, 1971, and entitled "A SYNCHRO TO SIN/COS CONVERTER";
2. Ser. No. 171,577, to W.W.Greutman and I.R.-Studebaker, filed Aug. 13, 1971, and entitled "DIGITAL TO SIN/COS CONVERTER."

The subject matter of the above U.S. patent applications, insofar as they are pertinent to the present application for purposes of sufficiency of disclosure, essential matter and adequate support for the appended claims, is incorporated herein by reference.

BACKGROUND OF THE INVENTION

The invention relates to a simplified digital-to-sin/cos conversion arrangement, and more particularly to a radar resolver arrangement for converting azimuth change pulses (ACP's)/azimuth reference pulses (ARP's) to sine and cosine signals representative of for example the rotation (azimuth) of the radar antenna.

While the arrangement of the above referenced U.S. patent application Ser. No. 171,577, hereinafter referred to as the "second referenced application," is very reliable and accurate, it is, however, desirable to have a more simplified arrangement which would reduce the number of interconnections of circuit components in a printed circuit type of reduction to practice, without significantly sacrificing accuracy and reliability.

SUMMARY OF THE INVENTION

It is therefore an object of this invention to provide a more simplified arrangement of sample pulse generation while retaining accuracy and reliability in the conversion process.

It is another object of this invention to provide a substantial reduction in circuit component interconnections, particularly for printed circuit applications, by generating sample pulses other than by the bit-by-bit comparison of each stage of two counters and the comparator circuitry associated therewith.

According to the broader aspects of the invention there is provided a digital to sin/cos converter comprising first means for providing a reference sinusoidal waveform from a standard having a predetermined operating frequency; second means coupling said standard and input digital positional information for providing output sampling pulses representative of said input positional information; third means for referencing said first means and said second means responsive to input digital reference information; and fourth means coupling said sinusoidal reference waveform and said sampling pulses for providing a resultant sinusoidal output equivalent to said input digital positional information in response to a sampling of said reference waveform by said sampling pulses.

BRIEF DESCRIPTION OF THE DRAWINGS

The above-mentioned and other objects of this invention will become more apparent by referring to the following description taken in conjunction with the accompanying drawings, in which:

FIG. 1 is a block schematic diagram of a digital ACP-/ARP to azimuth sin/cos conversion arrangement according to the invention;

FIG. 2 is a schematic block diagram illustrating a modification of the referencing portion of the arrangement of FIG. 1 according to the invention; and FIG. 3 is a schematic block diagram illustrating another modification of the referencing portion of the arrangement of FIG. 1 according to the invention.

DETAILED DESCRIPTION OF THE PREFERRED EMBODIMENTS

Referring to FIG. 1, illustrated therein is a digital to sin/cos converter in which the ACP/ARP digital signals representative of for example the rotational (azimuth) position of a radar antenna are converted to sine and cosine positional information waveforms. An oscillator 3 provides a frequency standard in the form of a square wave output which is fed to a 12-stage reference counter 4 labeled counter A in FIG. 1. In the illustrated example, the operating frequency thereof is given as 245.76 KHz, which frequency is equivalent to 60 × 4,096 Hz. The 12-stage counter A is designed to divide the incoming frequency standard by 4,096 so as to provide a 60 Hz reference square wave at the output of the last stage thereof, i.e., the MSB or the most significant bit or stage ($2^{12}$). The 60 Hz reference square wave is in turn applied to the input of a slicer and limiter stage 8, the primary purpose of which is to provide amplitude stabilization in order to drive a low-pass filter stage 9 by way of a non-temperature sensitive stabilized input. Filter 9 in turn is designed to provide a symmetrical 60 Hz sinusoidal waveform from the stabilized square wave input. This 60 Hz waveform in turn is fed to an impedance matching amplifier whose output as indicated in FIG. 1 is designated as a 60 Hz reference cosine wave.

Azimuth change pulses (ACP's) which are representative of for instance the azimuth rotation of an antenna, and which are generated by conventional means not shown are fed by way of input 1 along with the frequency standard 3 output to a mixer 5. The output of mixer 5 is in turn fed to a 12-stage counter 6 which is designated in FIG. 1 as 12-stage information counter B. Counter B is also intended to divide its input by 4,096. The output of the most significant ($2^{12}$) digit, i.e., the last or 12th stage of counter B is applied to a cosine sample pulse generator 11, the output of which in turn is applied along with the 60 Hz reference cosine wave to a sample/hold detector stage 12. The output of the cosine sample/hold detector stage 12 is in turn fed to a low-pass filter 13, the output of which at 14 is a cosine $\phi$ representation of the azimuth information received at input 1. The most significant bit (MSB), i.e., the last stage of counter B is additionally coupled, along with the output of the 11th stage ($2^{11}$) thereof to a 1,024-count detector 15. This counter is designed to provide a pulse 90° in phase relative to each (cosine) pulse output from the last stage of counter B. The output of the 1,024-count detector 15 is in turn applied to a sine sample pulse generator 16 which in turn provides a driving pulse for sampling the 60 Hz reference cosine wave in a sine sample/hold detector stage 17. The output of detector 17 in turn is passed through a low pass filter 18 to provide a sine $\phi$ representation at output 19 which is representative of the digital information received at input 1.

Azimuth reference pulses (ARP's) are received at input 2 and are coupled to the set input of a flip-flop stage 7, the output of the flip-flop 7 in turn being coupled to counter B as a reset by way of reset pulse generator 20. Additionally, the last (12th) stage output of reference counter A is coupled as a reset to the flip-flop stage 7.

For a better understanding of the specific circuitry comprising blocks 11–13 and 16–18 in FIG. 1, the reader is referred to the disclosure of the above mentioned referenced application Ser. No. 168,246, hereinafter referred to as the first referenced application. Similarly, the reader is referred to the second referenced application for detailed description as to the circuit content of blocks 3, 4 and 6 of FIG. 1.

OPERATION

In operation, the oscillator 3, running at 245,760 pps (4,096 × 60), is counted-out by counter A to derive the reference 60 Hz square wave. This square wave is then filtered to derive the 60 Hz reference cosine waveform. Slicer and limiter stage 8 and driver stage 10 are conventional as to circuit content, the former being provided to drive the conventionally designed low-pass filter 9 with a stabilized input, and the latter is merely an impedance matching amplifier. Information counter B in a like manner counts the oscillator 3 pulses, but has added to this count the number of ACP's arriving at input 1 by way of mixer stage 5. Thus, counter B advances with respect to counter A by one count per each ACP received. The specific circuitry performing the function of mixer 5 is deemed well within the skills of the artisan in the logic field and may for example be arranged according to the following. A flip-flop may be provided which is set each time an ACP is received at input 1. The leading edge of each pulse of the output of oscillator 3 is passed through mixer 5 to be counted in information counter B, and additionally is sent to the reset lead of the mixer flip-flop. Thus, whenever the flip-flop in the mixer stage 5 is set by an incoming ACP, the next incoming pulse from the standard 3, in addition to being passed to counter B, will reset the flip-flop and produce thereby an additional pulse which is also applied from mixer 5 to information counter B. Delay may be added as to the latter by any suitable conventional means to ensure a proper counting of all intended generated pulses.

The output of the last stage of 12-bit counter B, (i.e., the most significant bit or MSB) and the next to the last stage (i.e., the eleventh stage or MSB-1) of counter B are used to determine precisely 1,024 counts difference from the last generated cosine sample pulse. From the second referenced application it is well known that a count of 1,024 is equivalent to 90° of phase between the MSB and MSB-1 stages of counter B. Thus, if the final stage of counter B is designated a cosine sample pulse producing stage, an output of the 1,024-count detector 15 would occur 90° in phase relative to the last derived cosine sample pulse. The outputs of the counter B and the 1,024-count detector are then fed respectively to stages 11 and 16, which stages 11 and 16 may be termed respectively cosine and sine sample pulse generators. A cosine sample pulse occurs each time counter B has a zero count, i.e., the counter has completely cycled and clears, with the last stage returning to zero. By way of the 1,024-count detector 15, the sine sample pulse will occur 1,024 counts later. The 60 Hz reference cosine wave derived from counter A is sampled at the respective phases, in a manner more completely described in the first referenced application, to derive cosine $\phi$ and sine $\phi$ positional information signals respectively.

While the specific circuitry comprising the 1,024-count detector is believed well within the design skills of the logic artisan, a better understanding of the operation thereof may be derived from the following. When the last stage, i.e., the 12th stage, of counter B returns to a logic "0," and the next to the last stage of counter B, i.e., the 11th stage, thereafter goes from a "0" to a logic "1," a pulse output is derived from the 1,024-count detector 13 which is 90° displaced in phase from the pulse occurring when the 12th stage of counter B returned to the logic "0" state. The advantages of the instant arrangement over for instance that disclosed in the second referenced application are immediately apparent, in that the cosine and sine sample pulses are derived without having to consider the state of every bit or stage of counter B in view of the fact that the contents of counter B are known automatically each time an output pulse is produced from the last stage, i.e., each stage of counter B is cleared or clearing to "zero" at this point of operation.

The above description of the operation of the inventive arrangement according to FIG. 1 has been without a consideration of the azimuth reference pulses arriving at input 2. As in the second referenced application, the azimuth reference pulses ARP's may conventionally represent true north, with one ARP being received for every 360° of rotation. In the above-described arrangement the operation was not referenced to the input reference information. Referencing the system to the incoming azimuth reference pulses at input 2 in essence involves a resetting of the counter B contents to equal that of the counter A contents in dependence upon each ARP received. In the arrangement according to FIG. 1, this is accomplished by initially storing the received ARP pulse in flip-flop 7 such that when counter A returns to zero, i.e., clears, flip-flop 7 is reset thereby and in turn generates an output pulse via pulse generator 20 which also resets counter B to zero.

In other words, occurrence of ARP at terminal 2 sets the ARP flip-flop 7 as an indication that ARP has occurred since the previous reset. The first subsequent return of counter A to a fully cleared condition, as detected by the return of the MSB of counter A returning to the "0" state, is used to reset the ARP flip-flop 7 which in turn initiates generation of a counter B reset pulse. Thus, counter B is reset to be of equal phase with counter A (fully cleared) at the first return to cleared condition of counter A after occurrence of ARP. However, possible error can be incurred inasmuch as a number of ACP may occur after ARP but preceding counter B reset. Depending on when a ARP is received at input 2 relative to the instant of operation as to counters A and B, the maximum error derivable by referencing the inventive arrangement to the input reference information in this manner is one ACP per 360° of rotation, when the frequency of oscillator 3 is such that the output of counter A, i.e., the 60 Hz reference cosine wave is equivalent to the rate of the incoming ACP positional information.

While the above description with reference to FIG. 1 has been given in light of operating conditions in which the 60 Hz reference cosine wave is equivalent to the ACP input rate, it is to be noted that a greater error would be derived from the system in cases where the ACP input rate greatly exceeds the reference 60 Hz cosine frequency wave. Thus if the ACP rate is greater than the cyclic rate of counter A, the error incurred can be as great as the ACP rate/counter A cyclic rate. It is to be understood that it is within the scope of the present invention to choose the frequency of oscillator 3 to be any suitable value to derive a reference cosine wave which is equivalent to the input ACP rate. However, as a practical matter, the present invention finds ready application to the field of radar, and the reference frequency in radar applications is perhaps universally 60 Hz and in a majority of applications is much less than the incoming ACP rate. For converting a synchro analog radar station for example over to digital operation, such as is disclosed herein, very little more would be required than to change the positional information generator from analog to digital (ACP/ARP) operation and similarly the convertor section, if the digital reference frequency of the substituting digital converter were 60 Hz. Other operating reference frequencies would require substantially greater modification in the over all equipments. Therefore, it becomes desirable to retain the 60 Hz reference frequency, while at the same time accepting a ACP rate greater than the reference and also maintaining overall system accuracy and reliability.

According to the invention, therefore, the arrangement illustrated in FIG. 2 is provided which references the basic arrangement of FIG. 1 to the input reference information with a 0° phase shift between counters A and B, i.e, with no error of count difference between counter A and counter B, if the condition is maintained that the ratio (ACP rate/counter A cyclic rate) does not exceed $2^n$, where $n$ is the number of bits capacity in the ACP accumulator 21 in FIG. 2.

It should be noted that if the rates ratio becomes large enough that the accumulated bit capacity is equal to the counter B bit capacity, the circuit complexity becomes greater than that of the arrangement according to FIG. 3, described hereinafter.

In FIG. 2, as is the case in FIG. 1, a reset pulse is generated at the first cleared condition of counter A subsequent to the occurrence of ARP. However, an accumulator 21 is used to count the number of ACP's occurring after ARP and preceding reset pulse generation from unit 22. The reset pulse is used to clear the more significant bits of counter B', i.e., the (12-n)-counter portion 6a' of counter 6'. The less significant bit stages, i.e., the n-bit counter portion 6b' of counter B', are provided with data inputs. At the time of reset of the (12-n)-bit counter portion 6a', the accumulated count of the ACP accumulator 21 is strobed into the n-bit counter portion 6b' of counter B'. Thus, the phase of counter B' with respect to counter A is maintained without error.

Referring to FIG. 3, there is shown another arrangement for referencing the converter of FIG. 1 to the incoming ARP. This provision as provided by the arrangement of FIG. 3 is valid under all conditions and results in no error in the counter phases.

All stages of counter B'' are provided with strobed data inputs. The outputs from each stage of counter A are applied to the corresponding value data inputs of counter B''. By resetting the ARP flip-flop with the Q output of the master clock or oscillator 3, a strobe pulse is generated which presets counter B'' to equal counter A each time an ARP occurs, thus resetting with no phase error between counters.

The contents of reset pulse generator 20, reset and strobe pulse generator 22 and strobe generator 23 are of conventional arrangement and well within the design skills of the worker of ordinary skill in this art. Similarly, the specific structure of accumulator 22 and counters B' and B'' are of conventional design and require no further disclosure for one of ordinary skill in the art to understand, make and use the invention.

While the principles of this invention have been described in accordance with specific arrangements, it is to be understood that this description is given by way of example only and is not to be considered as a limitation on the scope of the invention, as set forth in the objects thereof and in the accompanying claims.

What is claimed is:
1. A digital to sin/cos converter comprising:
   a. first means for providing a single reference sinusoidal waveform from a standard having a predetermined operating frequency;
   b. second means coupled to said standard and to input digital positional information in the form of azimuth change pulses for providing output sampling pulses representative of said input positional information;
   c. third means coupled to said first means and said second means for referencing same to one another in response to input digital reference information in the form of azimuth reference pulses; and
   d. fourth means coupling said sinusoidal reference waveform and said sampling pulses for providing resultant sinusoidal and cosinusoidal outputs equivalent to said input digital positional information in response to a sampling of said single reference waveform by said sampling pulses.

2. The arrangement according to claim 1 wherein said first means including a first $n$-stage counter arrangement coupled to said frequency standard for providing an output signal of predetermined reduced frequency relative to said standard, and fifth means coupled to said first $n$-stage counter output signal for providing an output constituting said single stabilized sinusoidal reference waveform of predetermined frequency.

3. The arrangement according to claim 2 wherein second means includes a second $n$-stage counter arrangement providing an output signal of predetermined reduced frequency relative to said standard, and mixing means coupling said standard and said input digital positional information to said second $n$-stage counter arrangement for providing to said second counter a pulse for each cycle received from said standard and an additional pulse for each received element of said input positional information, so as to advance said second counter relative to said first counter by an amount equivalent to one count per each received element of said input positional information.

4. The arrangement according to claim 3 wherein said second means further includes a 90°-count detector, input coupled to said output of said second $n$-stage counter and to the $n$-1 stage thereof, for providing an output sampling pulse having a phase of 90° relative to each sampling pulse of said second counter output.

5. The arrangement according to claim 4 wherein said third means includes bistable means for presetting the $n$-stages of said second counter arrangement to the setting of the $n$-stages of said first counter arrangement in 1-to-1 correspondence in dependence upon the receipt by said bistable means of an element of said input digital reference information.

6. The arrangement according to claim 5 wherein said bistable means includes a bistable element having the set input thereof coupled to said input digital reference information, the reset input thereof coupled to the output signal of said first $n$-stage counter arrangement, and an output thereof coupled to said second $n$-stage counter arrangement, whereby said second counter is cleared whenever said bistable device is reset by an output from said first counter occurring when said second counter clears following a setting of said bistable device due to a received element of said input digital reference information.

7. The arrangement according to claim 4 wherein said second $n$-stage counter arrangement includes an $n$-bit counter portion and an $(m-n)$-significant bit counter portion, and wherein said third means includes an $n$-bit accumulator input coupled to said input positional information and coupled to said $n$-bit counter portion of said second $n$-stage counter arrangement by way of a plurality of individual connections, and bistable means, input coupled to said input reference information and to the output of said first $n$-stage counter arrangement and output coupled to said $n$-bit counter portion and said $(m-n)$-bit counter portion of said second $n$-stage counter arrangement, for setting the stages of said second $n$-stage counter arrangement in accordance with the accumulated information in said accumulator in dependence upon said bistable means being set by said input reference information and reset by the output of said first n-stage counter arrangement.

8. The arrangement according to claim 4 wherein each corresponding stage of said first and second $n$-stage counter arrangements are coupled in 1-to-1 correspondence, and wherein said third means includes bistable means, input coupled to said input reference information and to the output of said frequency standard and output coupled to strobe means which in turn is coupled to said second $n$-stage counter arrangement, for presetting the stages of said second $n$-stage counter arrangement to equal the corresponding stages of said first $n$-stage counter arrangement in response to a resetting of said bistable means by way of said frequency standard output each time said bistable means is set by said input reference information.

9. In a radar system employing digital antenna rotational information, a digital to sin/cos of azimuth converter comprising:
  a. first means for providing a single reference sinusoidal waveform from a standard having a predetermined operating frequency, said first means including an $n$-stage counter arrangement coupled to said frequency standard and providing an output signal of predetermined reduced frequency relative to said standard, and second means coupled to said first $n$-stage counter output for generating in response thereto a stabilized sinusoidal reference waveform of said predetermined frequency;
  b. third means coupled to input digital positional information and said standard, for providing output sampling pulses representative of said input positional information, said third means including a second $n$-stage counter arrangement providing an output signal of predetermined reduced frequency relative to said standard, and mixing means coupling said standard and said input digital positional information to said second $n$-stage counter arrangement for providing a pulse for each cycle received from each standard and an additional pulse for each received element of said input positional information, thereby advancing said second counter arrangement relative to said first counter arrangement by an amount equivalent to one count per each received element of said input positional information;
  c. fourth means coupled to said first means and said third means for referencing same to one another in response to input digital reference information in the form of azimuth reference pulses; and
  d. fifth means coupling said sinusoidal reference waveform and said sampling pulses for providing resultant sinusoidal and cosinusoidal outputs equivalent to said input digital positional information in response to a sampling of said single reference waveform by said sampling pulses.

* * * * *